Feb. 27, 1940.  M. E. CUPERY  2,191,754
PROCESS OF MAKING AMINOSULPHONIC ACID
Filed Jan. 25, 1938
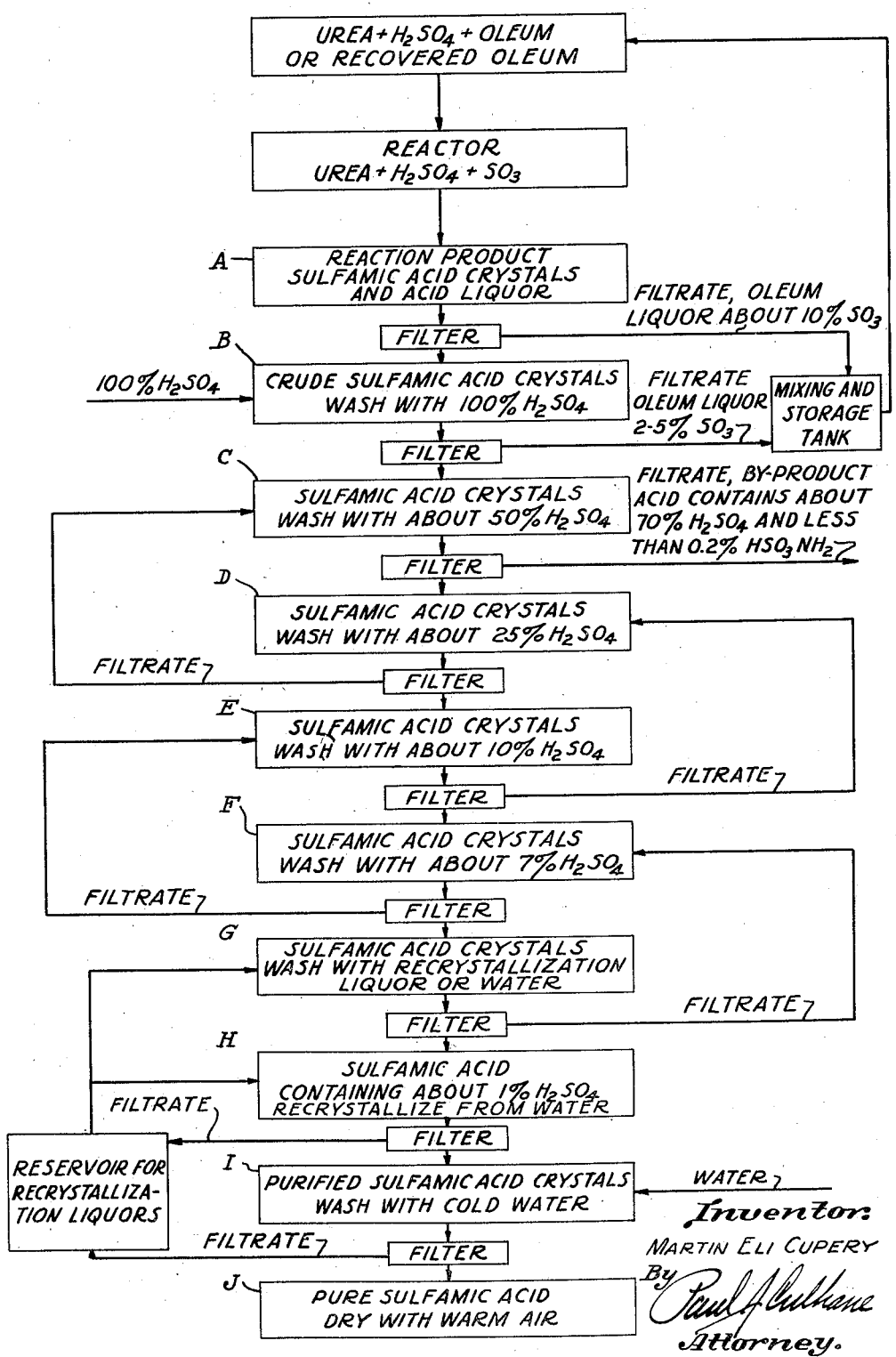
Inventor:
MARTIN ELI CUPERY
By Paul J. Culhane
Attorney.

UNITED STATES PATENT OFFICE 2,191,754

PROCESS OF MAKING AMINOSULPHONIC ACID

Martin Eli Cupery, Wilmington, Del., assignor to E. I. du Pont de Nemours & Company, Wilmington, Del., a corporation of Delaware Application January 25, 1938, Serial No. 186,894

6 Claims. (Cl. 23—166)

This invention relates to the manufacture of sulphamic acid, and more particularly to improvements in its preparation from urea and oleum. The present application is a continuation-in-part of my application Ser. No. 107,499, filed October 24, 1936.

Sulphamic or aminosulphonic acid is a known compound of the formula $NH_2SO_3H$. It has been prepared by Baumgarten and Marggraff [Ber. 64, 301 (1931)] through the reaction of urea with pyridiniumsulphonic acid and subsequent hydrolysis of the intermediate sulphonic acids. This pyridiniumsulphonic acid method, however, is not well adapted to commercial practice because of low yield, formation of undesirable by-products, and the relatively high cost of the pyrininium compound. More recently Baumgarten has shown in U. S. P. 2,102,350 (see also Ber. 69, 1935 (1936)) that sulphamic acid is formed by reacting urea with oleum, i. e., with a solution of sulphur trioxide in sulphuric acid. This oleum method is an important basic discovery and is inherently very attractive commercially because of the very low cost of the oleum, but the particular reaction conditions disclosed are not readily adapted to large scale operation and do not result in the best yields of a product of best quality.

The present invention has as its general object the development of a more economical and commercially feasible method for making sulphamic acid from urea and oleum. A further object is to minimize or substantially eliminate by-products containing ammonia nitrogen, such as ammonium acid sulphate. A further object is to prepare sulphamic acid in a physical form permitting ready filtration and purification. A further object is to provide methods for purification of crude sulphamic acid without substantial loss of product and uncombined reactants. A further object is to effect a reuse in the process of unreacted sulphur trioxide, and otherwise to prevent its loss, as by volatilization. A further object is to control effectively the exothermic reaction which takes place between sulphur trioxide and urea, whereby to permit a safer and more efficient large scale operation.

The above and other objects appearing hereinafter are accomplished by the following invention wherein urea is reacted for about 10 to 30 hours at about 40 to 50° C. with 20–28% oleum, i. e., oleum containing from about 20 to about 28% by weight of free sulphur trioxide, the oleum being used in such amount as to give a molal ratio of sulphur trioxide to urea in the range of from about 1.25:1 to about 1.8:1, and thereafter optionally purifying the sulphamic acid in accordance with methods given more fully below.

I have discovered that, if the reaction between urea and excess oleum—instead of being permitted to proceed normally to completion in a short time—is caused to extend over the abnormally long period of 10 to 30 hours, the final sulphamic acid-oleum sludge can be readily filtered, the acid being easily and more quickly separated from the mother liquor. I have also found that, through this abnormal extension of the reaction time, yields of above 90% (based on the urea) can be obtained while employing oleum of relatively low strength (not above 28% $SO_3$) and relatively low mol ratios of sulphur trioxide to urea (1.25 to 1.8 mols $SO_3$ per mol of urea). The desired prolongation of reaction time is accomplished by properly controlling the temperature, oleum concentration, and $SO_3$:urea mol ratio, or, more specifically, by keeping them within the limits stated above.

In beginning the present process, it is possible to add the urea to the proper amount of the proper strength oleum provided the mixing is done cautiously (as by adding the urea portionwise) and due care is taken to prevent the temperature from rising to 40° C. However, because of the initial exothermic reaction, the proper ratio of sulphur trioxide to urea and the proper concentration of the oleum are most advantageously and conveniently developed by dissolving the urea in concentrated (e. g. 95–100%) sulphuric acid, or in oleum containing not more than 10% free sulphur trioxide, and thereafter gradually introducing the proper amount of oleum containing above 40% free sulphur trioxide or of pure sulphur trioxide. Since an oleum containing 40% free sulphur trioxide contains about 89% total $SO_3$, the oleum added may be described as one containing from 89–100% total sulphur trioxide. The weak oleum required is advantageously the filtrate from a previous preparation of sulphamic acid, to which may or may not have been added the still more dilute oleum which results from washing the crude sulphamic acid with 100% sulphuric acid. It is, of course, necessary to measure beforehand the exact strength of the weak oleum in which the urea is to be dissolved in order to know how much strong oleum to introduce subsequently.

The reaction as a rule is complete when no more carbon dioxide is evolved. As will be apparent, when the higher temperatures in the range of 40 to 50° C. are used, the shorter periods of time within the range 10 to 30 hours suffice. The same is true with higher strength oleums, and, to a lesser extent, with higher molal ratios of sulphur trioxide to urea. See in this connection Tables 1 to 6. After apparent evolution of carbon dioxide has ceased, the reaction mixture may if desired be heated at 55 to 60° C. for 0.5 to 2.0 hours to insure completeness of reaction, and the quality of the product will not be substantially affected; however, this is in general unnecessary and is entirely so when the filtrate from the reaction is to be reused in the process.

For best results, the reaction mixture should be stirred throughout the process, but not too rapidly as otherwise the filterability of the product may be decreased. Suitable rates of stirring will be evident from the examples given hereinafter.

Each range of conditions and proportions indicated as proper plays a definite and important role in the achievement of a successful commercial process. The most important is the proper time control, on which the mentioned prior art process is silent, and through which a readily filterable and purifiable product is obtained without hazard or appreciable loss of the ingredients used. To illustrate: if the reaction is carried out over a period of 16 hours (42–43° C., 23% oleum and 1.5 mols $SO_3$/mol urea), a product is obtained which can be filtered in one hour or less; if the reaction time is shortened to about 7 hours by raising the temperature to 55–65° C., other conditions being equal, from 3 to 5 hours are needed to filter the product; and, if the reaction is allowed to proceed spontaneously to completion (the strength oleum and $SO_3$:urea mol ratio still being the same), the temperature rises to 125–135° C., the reaction is complete in about ½ hour, and from 16–30 hours are required for the filtration. It is thus apparent that, while the reaction can be carried out in less than 10 hours by employing temperatures above 50° C. (this can also be done in other ways, as by using strong oleum), the longer reaction time is necessary if a readily filterable product is to be obtained.

Aside from its effect on time of reaction, the temperature should also be kept low, especially in the initial stages of the reaction, in order to reduce to a minimum the amount of ammonium acid sulphate which is often found as a by-product from the reaction of urea with sulphuric acid. The latter reaction takes place chiefly at relatively high temperatures (above about 60° C.), and, if the reaction temperature is kept below 50° C. until the urea is removed from the zone of reaction (either by conversion to sulphamic acid or to the probable intermediate ureasulphonic acid, $NH_2CONHSO_3H$), the formation of ammonium acid sulphate is practically eliminated. To illustrate: when the reaction, employing 23% oleum and a urea:$SO_3$ mol ratio of 1:1.5, is carried out at 45° C. for 15 hours, less than 8% of the urea is converted to by-products containing ammonia nitrogen, whereas, other conditions being equal, the use of temperatures up to 75° C. for such period of time (less than 10 hours) as is required to complete the reaction causes about 13% of the urea to be lost in the formation of by-products, and the carrying out of the reaction at 75 to 130° C. (at which temperature it is complete in less than one hour) causes a loss of about 20% of the urea.

The indicated minimum concentration of oleum (about 20%) is necessary to make the reaction proceed below 50° C. at a practical rate and to a proper degree of completion; thus reaction at 45° C. with about 17% oleum, the $SO_3$:urea mol ratio being 1.25:1, is only about 60% complete after 15 hours, whereas the use of 20% oleum at the same temperature and $SO_3$:urea mol ratio causes the reaction to be about 85% complete in 15 hours. Also, lower oleum concentrations result in formation of larger amounts of ammonium acid sulphate, especially at the higher temperatures required for reaction; for example the filtrate obtained upon completing the first of the two preparations just referred to contains 2.12% nitrogen as combined ammonia (representing a urea loss of 50%), whereas that from the second contains only 0.68% ammonia nitrogen (representing a urea loss of only 15%). Below about 20% oleum concentration, the filtration of the product is more difficult, and it is necessary to manipulate excessive amounts of reaction mixture.

The maximum concentration of oleum (28%) for best results is also dictated to some extent by the necessary time and temperature conditions; that is, if the oleum exceeds a 28% strength, the reaction is strongly exothermic and proceeds to completion too violently, and by-product formation is excessive. An oleum concentration of 28% permits the reaction to be carried out evenly and safely at 40 to 42° C. in about 10 hours with less than 8% loss of urea and with formation of a product of satisfactory filterability, whereas, at comparable $SO_3$:urea mol ratios, the use of oleum concentrations of 30% and above result in excessive by-product formation (urea loss of 20% or more), exceedingly bad volatilization of sulphur trioxide, and frequent uncontrollable and dangerous foaming—all of which are probably due to the undesirably more rapid rate of reaction and higher temperatures developed; for example, at 45% oleum concentration, the temperature may spontaneously go as high as 130° C. In other words, too high an oleum concentration makes commercially impracticable the proper control of the reaction, especially in its early stages. Still another point is that the use of too high an oleum concentration makes inconvenient the manipulation of the final reaction mixture because an excessive amount of solid as compared to liquid is then present and the resulting large cakes of product are troublesome to break up, filter off, and wash properly.

The molal ratio of sulphur trioxide to urea (from 1.25:1 to 1.8:1) has the following basis. An appreciable excess is necessary to cause the relatively more expensive urea to be completely used up and readily removed from the zone of reaction, thereby preventing formation of ammonium acid sulphate. The maximum of 1.8 mol is chiefly an approximate top figure beyond which no further advantage is apparent. The excess sulphur trioxide does no harm and need not be lost since it can be recovered and reused in the process.

If the present process is properly carried out, excellent yields (average above 90%, based on the urea) are obtained. The product is of high quality and rarely requires any purification except washing for most purposes. However, if a very pure product is desired, it may be recrystallized from hot water or aqueous lower aliphatic alcohols and ketones, such as aqueous methanol, ethanol, or acetone.

The following examples, in which parts are by weight unless otherwise indicated, illustrate the more detailed practice of the invention. There are, of course, many forms of the invention other than these specific embodiments.

EXAMPLE I

One hundred (100) parts of dry, finely divided, crystalline urea, screened through a 10-mesh per inch screen, is added over a period of about 45 minutes to 560 parts of 100% sulphuric acid while stirring with an efficient paddle-type agitator operating at 80 to 100 revolutions per minute, and while cooling the solution externally in order to maintain a solution temperature below about 40° C. To the resulting solution is added with stirring and cooling 309 parts of oleum containing 65% by weight of free sulphide trioxide; this results in an oleum concentration of 23% free sulphur trioxide and a molal ratio of sulphur trioxide to urea of 1.5:1. The rate of stirring is then decreased to about 40 R. P. M., which produces only a mild mixing of the solution. The temperature is next raised to 42° C., at which point the reaction soon becomes perceptible by an increased evolution of carbon dioxide. The temperature is maintained at 42–45° C. for 16 hours by external heating or cooling as required, after which time no more carbon dioxide is evolved and the reaction is substantially complete. Sulphamic acid precipitates in increasing amounts throughout this period. The product is then filtered from the reaction mixture through an acid-resistant vacuum filter. No difficulty in filtration is experienced. The filtered product is then washed, first with 100 parts of 100% sulphuric acid, next with 300 parts of cold 50% sulphuric acid, and finally with 300 parts of cold 90% methanol. The filtrates from the final reaction mixture and from the 100% sulphuric acid wash are preserved for reuse in the process inasmuch as both contain appreciable amounts of sulphur trioxide. After washing and drying, there is obtained 291 parts or a 90% yield of practically pure sulphamic acid, a white crystalline solid melting with decomposition at 205° C. It is identified as sulphamic acid in a number of ways. In strong alkali no ammonia is liberated. It has on analysis a nitrogen content of 14.48%, whereas the amount calculated to be present is 14.44%. Titration with standard alkali shows a neutralization equivalent of 97.0, the theoretical value.

The process as carried out above is readily reproducible in a safe manner on a large scale. The strong initial exothermic reaction is reduced and made to take place steadily and evenly over a period of time, as shown by the comparatively slow yet steady evolution of carbon dioxide during most of the heating period. Temperatures, proportions, and concentrations are all so integrated that very little sulphur trioxide is lost by volatilization. Similarly the urea is practically all used up since the filtrate from the final reaction mixture contains only 0.68% residual nitrogen, which shows the formation of only negligible amounts of soluble by-products. The process is thus almost ideally economical since the initially very inexpensive raw materials are consumed to a high degree.

As already indicated, it is advantageous to reuse in the process the weak oleum filtrates from previous preparations. This is illustrated in

EXAMPLE II

The filtrate from the reaction mixture of Example I is combined with the filtrate from the 100% sulphuric acid wash in the proportion of about 17 to 10 parts, respectively, whereby oleum of 6.5% strength is obtained. To 621 parts of this oleum is added 100 parts of urea while stirring and cooling externally to keep the temperature below 40° C. To the resulting solution is added with stirring 246 parts of 65% oleum, the temperature still being held below 40° C. This gives an oleum concentration of 23% and a urea:sulphur trioxide molal ratio of 1:1.5. When all the strong oleum is added, the temperature is raised to 42–43° C., where it is maintained for 18 hours with slow stirring, after which time the evolution of carbon dioxide has practically ceased and the reaction is at least 95% complete. To insure the highest possible degree of reaction without serious harm to the product, the reaction mixture may then optionally be heated for 2 hours at 55° C. In any case, the final mixture is cooled to 30° C., and the sulphamic acid, which has precipitated throughout the reaction, is removed by filtering through an acid-resistant vacuum filter. The filtration step is carried out without difficulty. The filtered sulphamic acid is then washed, first with 100% sulphuric acid, then successively with several portions of aqueous sulphuric acid of diminishing strengths and saturated with sulphamic acid, and finally with cold water to remove sulphuric acid. The filtrates from the reaction mixture and from the 100% sulphuric acid wash are retained for reuse in the process. After washing, there is obtained 340 parts of crude sulphamic acid cake containing 88.4% sulphamic acid and 1.38% sulphuric acid, the remainder being water; this represents a yield of 92.6%. A recrystallized sample melts at 205° C. and has a nitrogen content of 14.84%. The filtrate from the reaction mixture of this example contains but a trace of ammonia nitrogen.

One particular set of conditions which I have found to give outstanding results is as follows: the temperature of reaction in the range 42 to 45° C.; the time of reaction about 15 to 20 hours; the oleum concentration about 23 to 25; and the sulphur trioxide:urea molal ratio about 1.4:1 to 1.6:1. The oleum strength and amount of sulphur trioxide are arrived at by dissolving the urea in 5 to 8% oleum and then adding the necessary amount of 55 to 75% oleum. Each variable can, however, be changed so that it is outside these ranges (but within the broader ranges herein disclosed) and an equally effective set of conditions arrived at by making a compensating change of one or more of the other variables in accordance with the principles herein disclosed and further explained by the following tables in which all variables except those referred to in the caption of each table are constant, and in which all figures are based on an about 95% complete reaction.

TABLE 1.—*Time and temperature*

| Temperature employed | Time for 95% reaction with 23% oleum and 1.5 mols SO₃/ mol urea | Time of reaction | Best temp. with 23% oleum and 1.5 mols SO₃/mol urea |
|---|---|---|---|
| °C. | Hours | Hours | °C. |
| 40 | 24 | 10 | 52 |
| 43 | 18 | 16 | 45 |
| 46 | 15 | 24 | 40 |
| 50 | 12 | 30 | 38 |

TABLE 2.—*Oleum concentration and temperature*

| Oleum concentration | Best temp. at 16 hrs. heating and 1.5 mols $SO_3$/mol urea | Temperature | Best oleum concentration at 16 hrs. heating and 1.5 mols $SO_3$/mol urea |
|---|---|---|---|
| Percent | °C. | °C. | Percent |
| 20 | 50 | 40 | 26 |
| 23 | 44 | 43 | 24 |
| 25 | 41 | 46 | 22 |
| 28 | 38 | 50 | 20 |

TABLE 3.—*Oleum concentration and time of heating*

| Oleum concentration | Time for 95% reaction at temp. of 42–43° C. and with 1.5 mols. $SO_3$/mol urea | Time of reaction | Best oleum concentration at temp. of 42–43° C. and with 1.5 mols $SO_3$/mol urea |
|---|---|---|---|
| Percent | Hours | Hours | Percent |
| 20 | 24 | 12 | 28 |
| 23 | 18 | 16 | 24 |
| 25 | 15 | 24 | 20 |
| 28 | 12 | 30 | 17 |

TABLE 4.—*Amount of $SO_3$ and temperature*

| Mols $SO_3$ (as 23% oleum) per mol urea | Best temp. when time of reaction = 16 hrs. | Temperature | Best amount of $SO_3$ (as 23% oleum) for reaction time of 16 hours |
|---|---|---|---|
| | °C. | °C. | |
| 1.25 | 50 | 40 | 1.75 mols/mol urea. |
| 1.50 | 44 | 43 | 1.6 mols/mol urea. |
| 1.75 | 40 | 46 | 1.4 mols/mol urea. |
| | | 50 | 1.25 mols/mol urea. |

TABLE 5.—*Amount of $SO_3$ and time of heating*

| Mols $SO_3$ (as 23% oleum) per mol urea | Time of heating at 42–43° C. for 95% reaction | Time of heating | Amount of $SO_3$ (as 23% oleum) for 95% reaction at 42–43° C. |
|---|---|---|---|
| | Hours | Hours | |
| 1.25 | 26 | 14 | 1.75 mols/mol urea. |
| 1.50 | 18 | 16 | 1.6 mols/mol urea. |
| 1.75 | 14 | 24 | 1.3 mols/mol urea. |
| | | 30 | 1.2 mols/mol urea. |

TABLE 6.—*Amount of $SO_3$ and strength of oleum*

| Mols $SO_3$ per mol urea | Best strength oleum at 42–43° C. and 16 hours | Strength oleum | Best amount of $SO_3$ at 42–43° C. and 16 hours |
|---|---|---|---|
| | Percent | Percent | |
| 1.30 | 28 | 20 | 1.75 mols/mol urea. |
| 1.50 | 24 | 23 | 1.6 mols/mol urea. |
| 1.75 | 20 | 25 | 1.4 mols/mol urea. |
| | | 28 | 1.3 mols/mol urea. |

Special methods of washing and purification have already been alluded to as being a part of the present invention. In order to minimize loss of sulphamic acid in the various filtration and washing operations, and in order to utilize substantially all the sulphur trioxide and urea (except those traces which are chemically converted to ammonia nitrogen-containing by-products), I have devised and recommend a continuous countercurrent cycle of washing and slurrying operations that can be used from batch to batch. These operations are illustrated in the drawing.

The above system is operated as follows. The reaction product, consisting chiefly of sulphamic acid and unreacted excess oleum, is filtered, and the crude sulphamic acid thus obtained is washed with 100% sulphuric acid and again filtered off. These two filtrates, both of which contain considerable sulphur trioxide, are combined in a mixing tank and preserved for reuse in the process. The crystals are then washed successively with approximately 50%, 25%, 10%, and 7% aqueous sulphuric acid, and finally with cold water, after which they may be recrystallized from hot water if a very pure product is desired. The filtrate from the 25% acid wash (designated as step D in the diagram) will absorb sufficient sulphuric acid from the product to increase its sulphuric acid content up to about 50%; it is then used as the step C wash given in the drawing for purifying the next successive batch of sulphamic acid. Similarly, the filtrate from the 10% acid wash (step E of the drawing) will absorb enough sulphuric acid from the crystal cake to increase its sulphuric acid content up to about 25% $H_2SO_4$; it is then used as step D wash for the next batch of sulphamic acid. Finally the very weak acid from the recrystallization liquor or from a water wash is used in the final washing steps and the filtrate is retained separately for subsequent washing of the next batch of sulphamic acid as indicated in the diagram. The amount of water introduced into the countercurrent wash system at steps I or G of the drawing is determined by the amount of sulphuric acid remaining in the crude sulphamic acid cake at step C of the drawing and corresponds to the amount required to dilute such acid to about 70% sulphuric acid. The amounts of wash solution for each step and the number of steps employed may be varied, of course, in order to produce results similar to those described.

Considering the above steps in reverse order, (a) water is used for the final washing to remove the small amount of residual $H_2SO_4$; (b) this filtrate is used for the next to the last washing on a second lot of crystals to remove the somewhat greater amount of sulphuric acid remaining on them; (c) this filtrate is then used for the second from the last wash on a third lot of crystals which contain still more sulphuric acid; (d) and so on until the sulphuric acid concentration is built up to 70%. During stage (a) considerable sulphamic acid is carried into solution, but as the sulphuric acid content increases, this is reprecipitated and the final 70% sulphuric acid—which leaves the process as a useful by-product—contains less than 0.2% sulphamic acid.

The application of the above washing operations to a given batch of sulphamic acid is given in

EXAMPLE 3

One hundred (100) parts of urea are dissolved with rapid stirring and efficient cooling in 649 parts of 7% oleum (being a mixture of the filtrates from the final reaction mixture and the 100% acid wash of a previous preparation), to which solution was then gradually added 230 parts of 65% oleum. There is thus obtained an oleum concentration of 23% and a sulphur trioxide: urea molal ratio of 1.5:1. Until the mixing is complete, the temperature should be kept below 40° C. Afterwards it is raised first to 42–43° C., where it is maintained for 8 hours, and then to 44–45° C., where it is maintained for a further 8 hours. At the end of this time, evolution of carbon dioxide has ceased and the reaction is practically complete. The crude sulphamic acid, which has gradually precipitated throughout the reaction, is removed by filtration through an acid-resistant vacuum filter, the filtration being readily carried out. The filtrate, which contains only a trace of ammonia nitrogen and thus practically no by-products, is preserved for reuse. The crude sulphamic acid is first washed with 100 parts of 100% sulphuric acid in order to remove residual sulphur trioxide, filtered off, and the filtrate combined with the filtrate from the final reaction mixture. It is important at this point to have a good vacuum (23-24 inches is satisfactory) and to remove from the sulphamic acid all the wash acid possible (1-2 hours' time under vacuum generally desirable). The resulting crystals are now washed consecutively with 150 parts of cold 50% sulphuric acid, 100 parts of cold 25% sulphuric acid, 100 parts of cold 10% sulphuric acid, 185 parts of cold 7% sulphuric acid (such wash solutions being those retained from washing a previous batch of sulphamic acid and therefore being saturated with sulphamic acid), and finally with 40 parts of cold water. These amounts and concentrations are not rigid since satisfactory results are still obtainable if variations of 10% above or below in concentrations and amounts are made. The principle is that there must first be a good wash with 100% acid, followed by several washings of acids of decreasing strength, and finally with water, all the washing liquids being used in the smallest amount that is consistent with efficient washing. The final product when dried (amounting to 298 parts or a yield of 92%) contains around 1% free sulphate, which is not objectionable for most purposes. A highly pure sulphamic acid containing only a trace of sulphate can be obtained by a single crystallization from hot water.

The present process differs from the prior art in specifying a rigid time and temperature control, on which the prior art is silent; in requiring only a moderate molal excess of sulphur trioxide, i. e., from 1.25 to 1.80 mols per mol of urea as compared to 2.8 to 3.0 mols per mol of urea; in requiring moderate (20-28%) instead of high (above about 30%) strength oleum; and in offering a system of washing operations for purifying the product. The advantages of these changes are summarized as follows: (1) low amount of ammonia-nitrogen by-products and correspondingly increased yield of sulphamic acid; (2) complete utilization of sulphur trioxide by (a) reuse of oleum filtrates in process and (b) minimized volatilization; (3) safe reproducibility on large scale through control of the exothermic reaction; (4) production of a product having a physical form permitting ready filtration and purification; and (5) minimum loss of sulphamic acid by solution in wash acid and water. The net result is production of a pure product with maximum conversion of raw materials, minimum loss of product, and minimum processing cost.

In the specification and claims, the term "20% oleum" or the like refers to an oleum containing 20% by weight of free or excess sulphur trioxide over that present in the form of sulphuric acid $H_2SO_4$.

The above description and examples are intended to be illustrative only. Any modification or variation thereby which conforms to the spirit and scope of the invention is intended to be included.

I claim:

1. Process for preparing sulphamic acid which comprises reacting urea with 20 to 28% oleum to complete the reaction in from 10 to 30 hours at 40° C. to 50° C., the sulphur trioxide and urea being employed in the molal ratio of 1.25 to 1.8 mols of sulphur trioxide per mol of urea.

2. Process for preparing sulphamic acid which comprises dissolving urea in sulphuric acid having dissolved therein from 0 to 10% free sulphur trioxide, introducing oleum containing 89-100% total sulphur trioxide in sufficient amount to give a 20 to 28% oleum concentration and a sulphur trioxide to urea molal ratio of from 1.25:1 to 1.8:1, and heating at 40 to 50° C. to complete the reaction in from 10 to 30 hours.

3. Process according to claim 1 in which the urea is dissolved in oleum of low sulphur trioxide content, which oleum is obtained from the preparation and purification of a previous batch of sulphamic acid.

4. Process for preparing sulphamic acid which comprises dissolving urea in about 5 to 8% oleum, introducing 55 to 75% oleum in sufficient amount to give a 23 to 25% oleum concentration and a sulphur trioxide to urea molal ratio of from 1.4:1 to 1.6:1, and heating at 42 to 45° C. to complete the reaction in from 15 to 20 hours.

5. Process for preparing sulphamic acid which comprises dissolving urea in sulphuric acid having dissolved therein from 0 to 10% sulphur trioxide, introducing oleum containing 89-100% total sulphur trioxide in sufficient amount to give a 20 to 28% oleum concentration and a sulphur trioxide to urea molal ratio of from 1.25:1 to 1.8:1, heating at 40 to 50° C. to complete the reaction in from 10 to 30 hours, filtering the sulphamic acid from the reaction product, and washing it successively with 100% sulphuric acid, with several lots of aqueous sulphuric acid of diminishing strength, and with water.

6. Process according to claim 4 in which the washing with aqueous acid is conducted with acids of about 50%, 25%, 10%, and 8% strengths, which acids are substantially saturated with sulphamic acid as a result of having been used at lower strengths to wash a previous batch of sulphamic acid.

MARTIN ELI CUPERY.